United States Patent
Yoshiura

(10) Patent No.: US 11,104,210 B2
(45) Date of Patent: Aug. 31, 2021

(54) FRONT STRUCTURE OF SADDLE-TYPE VEHICLE

(71) Applicant: SUZUKI MOTOR CORPORATION, Hamamatsu (JP)

(72) Inventor: Toshiaki Yoshiura, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 99 days.

(21) Appl. No.: 16/564,813

(22) Filed: Sep. 9, 2019

(65) Prior Publication Data

US 2020/0094657 A1  Mar. 26, 2020

(30) Foreign Application Priority Data

Sep. 21, 2018 (JP) ............................. JP2018-177027

(51) Int. Cl.
*B62J 17/04* (2006.01)
*B60J 1/04* (2006.01)
*B62D 25/08* (2006.01)

(52) U.S. Cl.
CPC .............. *B60J 1/04* (2013.01); *B62D 25/081* (2013.01); *B62J 17/04* (2013.01)

(58) Field of Classification Search
CPC ..... B60J 1/04; B62J 17/02; B62J 17/04; B62J 17/08; B62J 45/20; B62J 50/21; B62J 50/225
USPC ................................................ 296/77.1, 78.1
See application file for complete search history.

(56) References Cited

U.S. PATENT DOCUMENTS

| | | | |
|---|---|---|---|
| 8,469,434 B2* | 6/2013 | Tsukui | B62J 17/04 296/78.1 |
| 2005/0110295 A1* | 5/2005 | Takemura | B62J 17/04 296/78.1 |
| 2009/0195011 A1* | 8/2009 | Tsuda | B62J 17/04 296/78.1 |
| 2012/0061989 A1* | 3/2012 | Yasuhara | B62J 17/00 296/78.1 |
| 2013/0249239 A1 | 9/2013 | Yokouchi et al. | 296/180.1 |
| 2014/0159426 A1 | 6/2014 | Takahashi et al. | 296/192 |

(Continued)

FOREIGN PATENT DOCUMENTS

| EP | 3 059 149 A1 | 2/2016 |
|---|---|---|
| JP | 2014-113994 A | 6/2014 |

OTHER PUBLICATIONS

Indian Office Action dated Aug. 14, 2020, issued by the Indian Patent Office in corresponding application IN 201914036976.

*Primary Examiner* — Gregory A Blankenship
(74) *Attorney, Agent, or Firm* — Stein IP LLC

(57) ABSTRACT

There is provided a front structure of a saddle-type vehicle. A meter is provided behind a headlight. A visor is disposed at an upper side of a vehicle body cover. A front cover portion forms a wall surface of the vehicle body cover and covers all or a part of upper, lower, left, and right sides of the headlight. A rear cover portion forms a wall surface of the vehicle body cover and covers all or a part of upper, lower, left, and right sides of the meter. A communication port is opened upward and configured to communicate an inside and an outside of the vehicle body cover is provided between the front cover portion and the rear cover portion. The visor is detachably attached to the vehicle body cover so as to cover the communication port from above.

6 Claims, 14 Drawing Sheets

(56) References Cited

U.S. PATENT DOCUMENTS

| | | | |
|---|---|---|---|
| 2014/0167441 A1* | 6/2014 | Shope | B62J 17/04 296/84.1 |
| 2014/0203594 A1* | 7/2014 | Tsukui | B60J 1/02 296/192 |
| 2015/0129342 A1* | 5/2015 | O'Rourke | F16M 13/02 180/219 |
| 2015/0130209 A1* | 5/2015 | Hamlin | B62J 9/20 296/78.1 |
| 2017/0240237 A1* | 8/2017 | Fraley | B62J 17/04 |
| 2017/0274953 A1* | 9/2017 | Niijima | F02M 35/162 |
| 2018/0086407 A1* | 3/2018 | Kaji | B62J 17/02 |
| 2020/0094657 A1* | 3/2020 | Yoshiura | B62J 6/027 |

\* cited by examiner

FRONT STRUCTURE OF SADDLE-TYPE VEHICLE

CROSS-REFERENCE TO RELATED APPLICATIONS

The disclosure of Japanese Patent Application No. 2018-177027 filed on Sep. 21, 2018, including specification, drawings and claims is incorporated herein by reference in its entirety.

TECHNICAL FIELD

The present disclosure relates to a front structure of a straddle-type vehicle, that is, a structure of a portion in the straddle-type vehicle where a headlight and a meter are provided.

BACKGROUND

In a saddle-type vehicle, an upper side, a left side, a right side or the like of a headlight and a meter provided in a front upper portion of the vehicle forms a structure which is covered by a vehicle body cover. For example, many sports-type motorcycles, medium-sized or large-sized scooters or the like have such a structure. Patent Document 1 describes a motorcycle having such a structure.

Patent Document 1: Japanese Patent Application Publication No. 2014-113994 A

In the saddle-type vehicle having a structure in which the headlight and the meter are covered by the vehicle body cover, operability of such as maintenance of the headlight, the meter or parts provided in a periphery thereof is not good. For example, during maintenance of the saddle-type vehicle, when attaching or detaching a cable connector to the headlight, the meter or the parts provided in the periphery thereof, it is necessary to insert a hand or a tool to an inside of the vehicle body cover from a gap under the vehicle body cover so as to perform the attachment or detachment, or it is necessary to remove the vehicle body cover from the vehicle and then to perform the attachment or detachment, which takes time and effort.

SUMMARY

It is at least one of objects of the present disclosure to provide a front structure of a saddle-type vehicle by which the operability of such as maintenance of the headlight, the meter or the parts provided in the periphery thereof can be improved.

According to an aspect of the embodiments of the present disclosure, there is provided a front structure of a saddle-type vehicle, comprising: a headlight provided in a front upper portion of the saddle-type vehicle; a meter provided behind the headlight in the saddle-type vehicle; a vehicle body cover that covers the front upper portion of the saddle-type vehicle; and a visor disposed at an upper side of the vehicle body cover, wherein the vehicle body cover includes: a front cover portion which forms a wall surface of a laterally central front portion of the vehicle body cover and covers all or a part of an upper side, a lower side, a left side and a right side of the headlight; and a rear cover portion which forms a wall surface of a laterally central rear portion of the vehicle body cover and covers all or a part of an upper side, a lower side, a left side and a right side of the meter, wherein a communication port opened upward and configured to communicate an inside and an outside of the vehicle body cover is provided between the front cover portion and the rear cover portion, and wherein the visor is detachably attached to the vehicle body cover so as to cover the communication port from above.

With the above configuration, the operability of such as maintenance of the headlight, the meter or the parts provided in the periphery thereof can be improved.

DETAILED DESCRIPTION OF THE EMBODIMENTS

A front structure of a saddle-type vehicle according to an embodiment of the present disclosure includes a headlight provided in a front upper portion of the saddle-type vehicle, a meter provided behind the headlight in the saddle-type vehicle, a vehicle body cover that covers the front upper portion of the saddle-type vehicle, and a visor disposed at an upper side of the vehicle body cover. The vehicle body cover includes a front cover portion and a rear cover portion. The front cover portion forms a wall surface of a laterally central front portion of the vehicle body cover and covers all or a part of an upper side, a lower side, a left side and a right side of the headlight. The rear cover portion forms a wall surface of a laterally central rear portion of the vehicle body cover and covers all or a part of an upper side, a lower side, a left side and a right side of the meter. A communication port opened upward and configured to communicate an inside and an outside of the vehicle body cover, is provided between the front cover portion and the rear cover portion. Further, the visor is detachably attached to the vehicle body cover so as to cover the communication port from above.

In the front structure of the saddle-type vehicle according to the embodiment of the present disclosure having the above structure, an operator can detach the visor and then perform such as maintenance of a part of the headlight or a part of the meter which face the inside of the vehicle body cover or other parts provided inside the vehicle body cover. Since maintenance or the like can be performed using the communication port, it is possible to save the effort of removing the vehicle body cover from the straddle-type vehicle when performing the maintenance or the like. Since the communication port is provided in the vehicle body cover in a manner of being opened upward, the operator can perform tasks such as maintenance in an easy posture. For example, the operator does not have to work under the vehicle. Therefore, the operability of such as maintenance of the headlight, the meter or the parts provided in the periphery thereof can be improved.

Embodiments of the present disclosure will be described below with reference to the drawings. For convenience of description, when describing directions of front (F), rear (B) left (L), right (R), upper (U), and lower (D), with respect to the configuration or operation of the saddle-type vehicle of the embodiment, arrows drawn at the lower right in each drawing is followed.

(Saddle-Type Vehicle)

Figure 1:
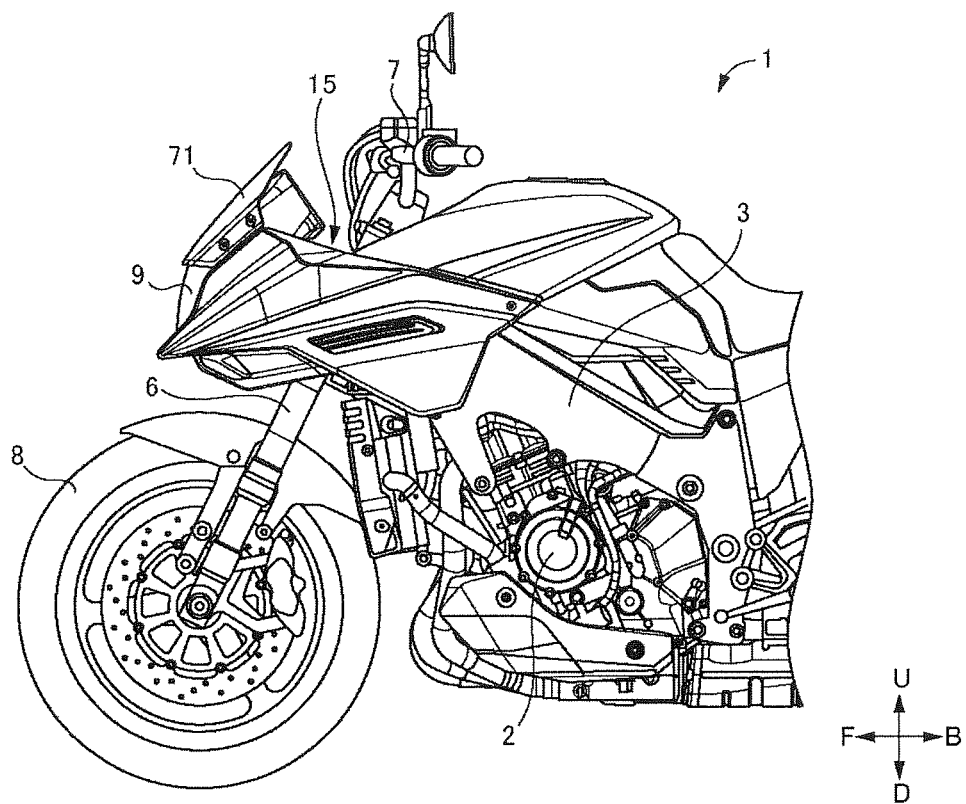
FIG. 1 is an external view showing a front portion of a straddle-type vehicle according to an embodiment of the present disclosure as viewed from left.
Figure 2:
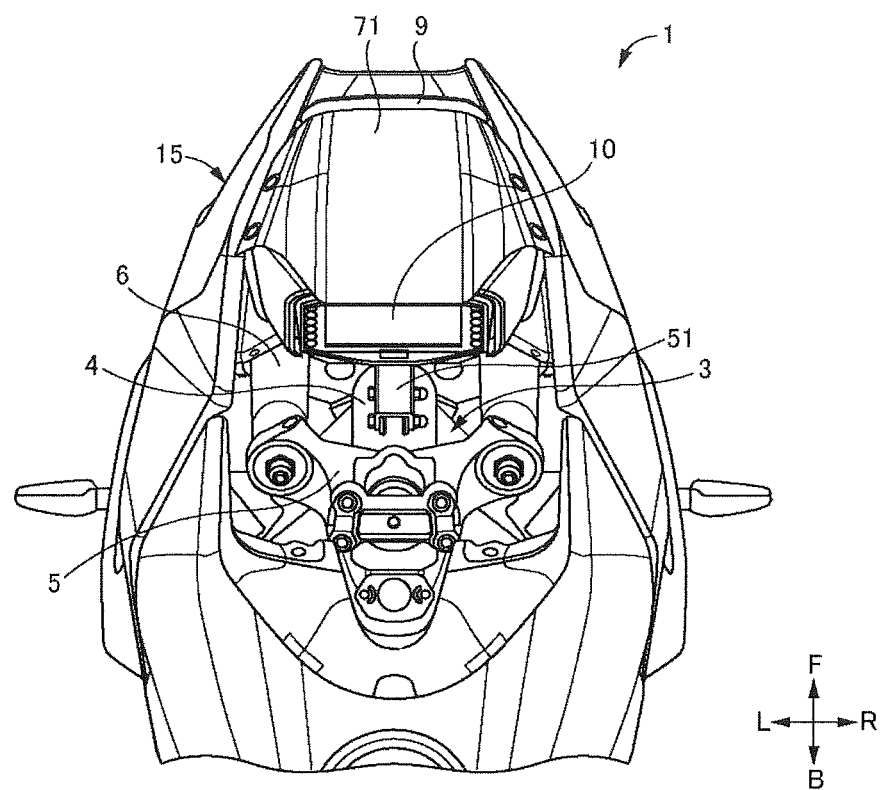
FIG. 2 is an external view showing the front portion of the straddle-type vehicle according to the embodiment of the present disclosure as viewed from above.

FIG. 1 shows a front portion of a straddle-type vehicle 1 according to an embodiment of the present disclosure as viewed from left. FIG. 2 shows the front portion of the straddle-type vehicle 1 as viewed from above. A handle and a front wheel is omitted in FIG. 2. As shown in FIG. 1 and FIG. 2, the straddle-type vehicle 1 is a motorcycle provided with a gasoline engine 2 as a power source. The straddle-type vehicle 1 includes a vehicle body frame 3 which forms a framework of the straddle-type vehicle 1 and supports the engine 2 and various components. In the saddle-type vehicle 1, a steering shaft is rotatably supported by a head pipe 4 disposed in a front upper portion of the vehicle body frame 3, and a front fork 6 and a handle 7 are supported by the steering shaft via a bracket 5. A front wheel 8 is rotatably supported at a lower end portion of the front fork 6.

A headlight 9 is provided in a front upper portion of the saddle-type vehicle 1. A meter unit 10 is provided behind and above the headlight 9 in the straddle-type vehicle 1. The headlight 9 and the meter unit 10 are secured to the head pipe 4 of the vehicle body frame 3 by a securing member 51 to be described later. The meter unit 10 includes, for example, a speedometer, a tachometer, an odometer, a fuel gauge, a turn signal indicator, a gear position indicator, a high beam indicator, and various warning lights, etc. The meter unit 10 in the present embodiment includes a liquid crystal display which functions as a speedometer, a tachometer, an odometer, a fuel gauge, a gear position indicator or the like by displaying a traveling speed, an engine speed, a traveling distance, a remaining amount of fuel, and a gear position, etc., and a plurality of lamps (for example, a plurality of light emitting diodes) which function as a turn signal indicator, a high beam indicator and various warning lights, etc. The specific configuration of the meter unit 10 is not limited to the above.

A vehicle body cover unit 15 is provided in the front upper portion of the straddle-type vehicle 1. The vehicle body cover unit 15 covers a front side, a left side and a right side of the front upper portion of the straddle-type vehicle 1. The vehicle body cover unit 15 in the present embodiment only covers the front side, the left side and the right side of the front upper portion of the straddle-type vehicle 1, does not cover a left side and a right side of a portion where the engine 2 is provided or a lower side of the engine 2 in the straddle-type vehicle 1, and is a so-called half cowl. A visor 71 is attached to a laterally central upper portion of the vehicle body cover unit 15. A front structure of the straddle-type vehicle 1 is configured by the headlight 9, the meter unit 10, the vehicle body cover unit 15, the visor 71, or the like.

(Vehicle Body Unit)

Figure 3:
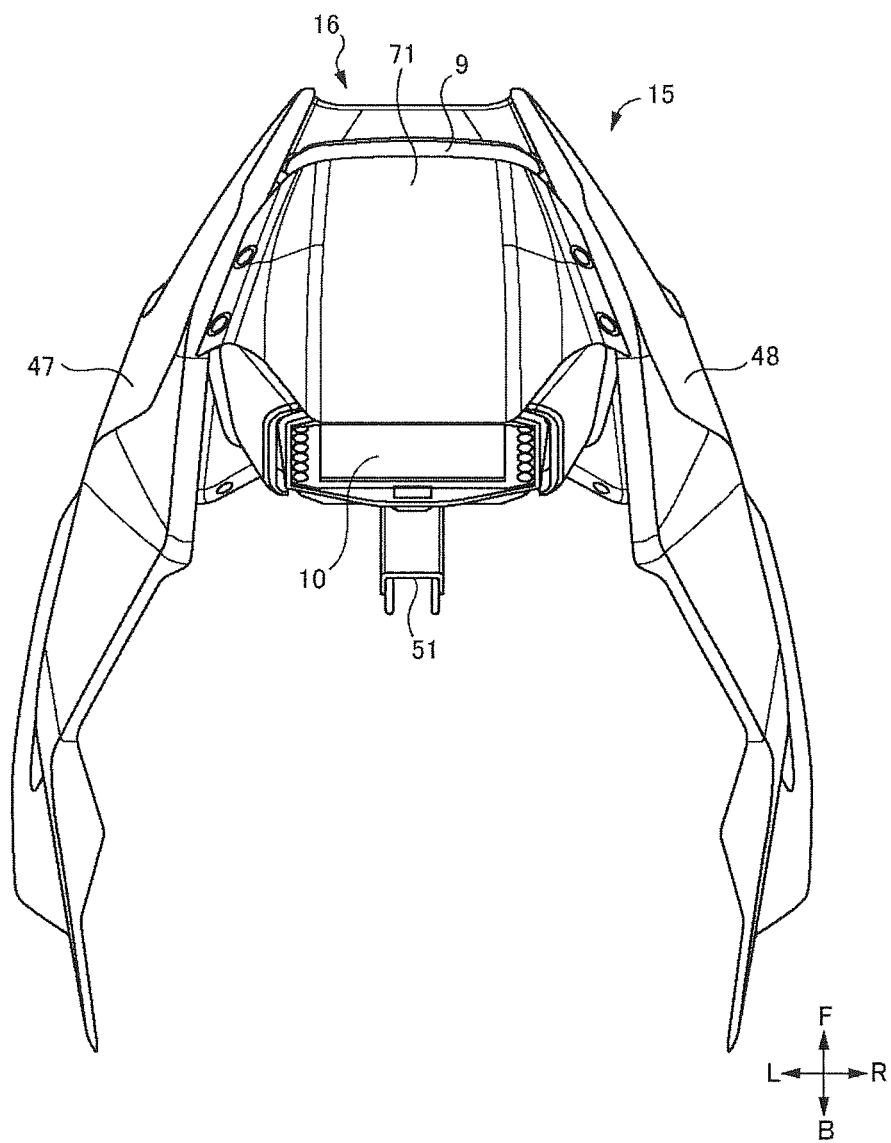
FIG. 3 is an external view showing a front structure of the straddle-type vehicle according to the embodiment of the present disclosure.
Figure 4:
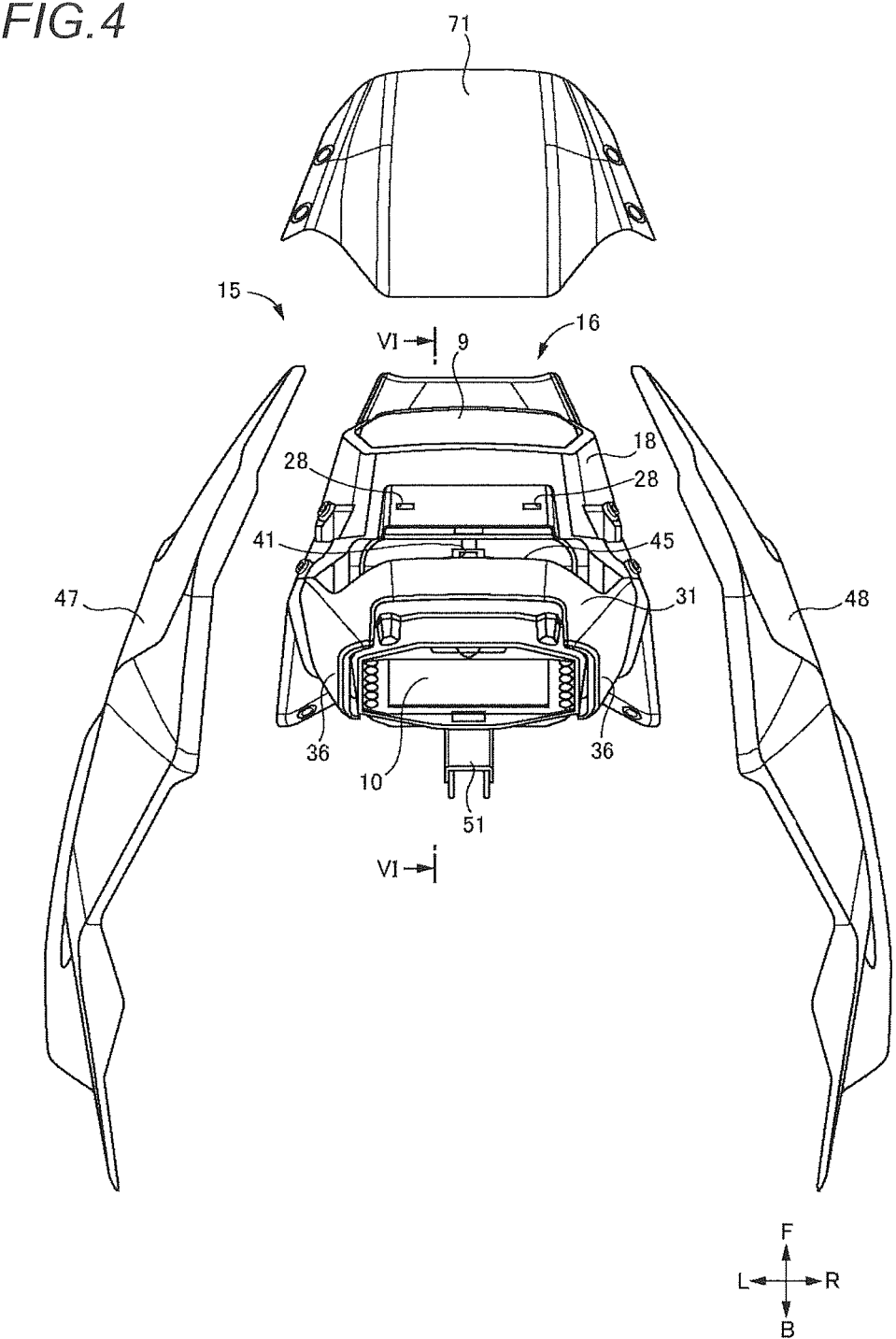
FIG. 4 is an illustrative view showing a state where a center cover, a left side cover, a right side cover, and a visor are separated in the front structure of the straddle-type vehicle according to the embodiment of the present disclosure.

FIG. 3 shows the headlight 9, the meter unit 10, the vehicle body cover unit 15, the visor 71, or the like. FIG. 4 shows a state where the visor 71 is detached from the vehicle body cover unit 15 and the vehicle body cover unit 15 is separated into a center cover 16, a left side cover 47 and a right side cover 48. As shown in FIG. 3 and FIG. 4, the vehicle body cover unit 15 includes the center cover 16, the left side cover 47 and the right side cover 48.

The center cover 16 is a vehicle body cover which covers the front side of the front upper portion of the straddle-type vehicle 1. As shown in FIG. 1 and FIG. 2, the center cover 16 is a laterally central portion of the straddle-type vehicle 1, and is disposed in front of the handle 7, in front of the front fork 6, and above the front wheel 8. The headlight 9 is disposed at a front side of the center cover 16, and the center cover 16 covers an upper side, a lower side, a left side, and a right side of the headlight 9. The meter unit 10 is disposed at a rear side of the center cover 16, and the center cover 16 mainly covers left and right sides of the meter unit 10.

The left side cover 47 is a vehicle body cover which covers the left side of the front upper portion of the straddle-type vehicle 1. The left side cover 47 is a left portion of the straddle-type vehicle 1, and is disposed below the handle 7 and on the left of the front fork 6. When the straddle-type vehicle 1 is viewed from left, the left side cover 47 is disposed above the front wheel 8. The left side cover 47 is connected to a left portion of the center cover 16, for example, by a fastener such as a screw or a rivet.

The right side cover 48 is a vehicle body cover which covers the right side of the front upper portion of the straddle-type vehicle 1. The right side cover 48 is disposed in the right portion of the saddle-type vehicle 1 at a position laterally symmetrical with the left side cover 47. The right side cover 48 is connected to a right portion of the center cover 16, for example, by a fastener such as a screw or a rivet.

(Center Cover)

Figure 5:
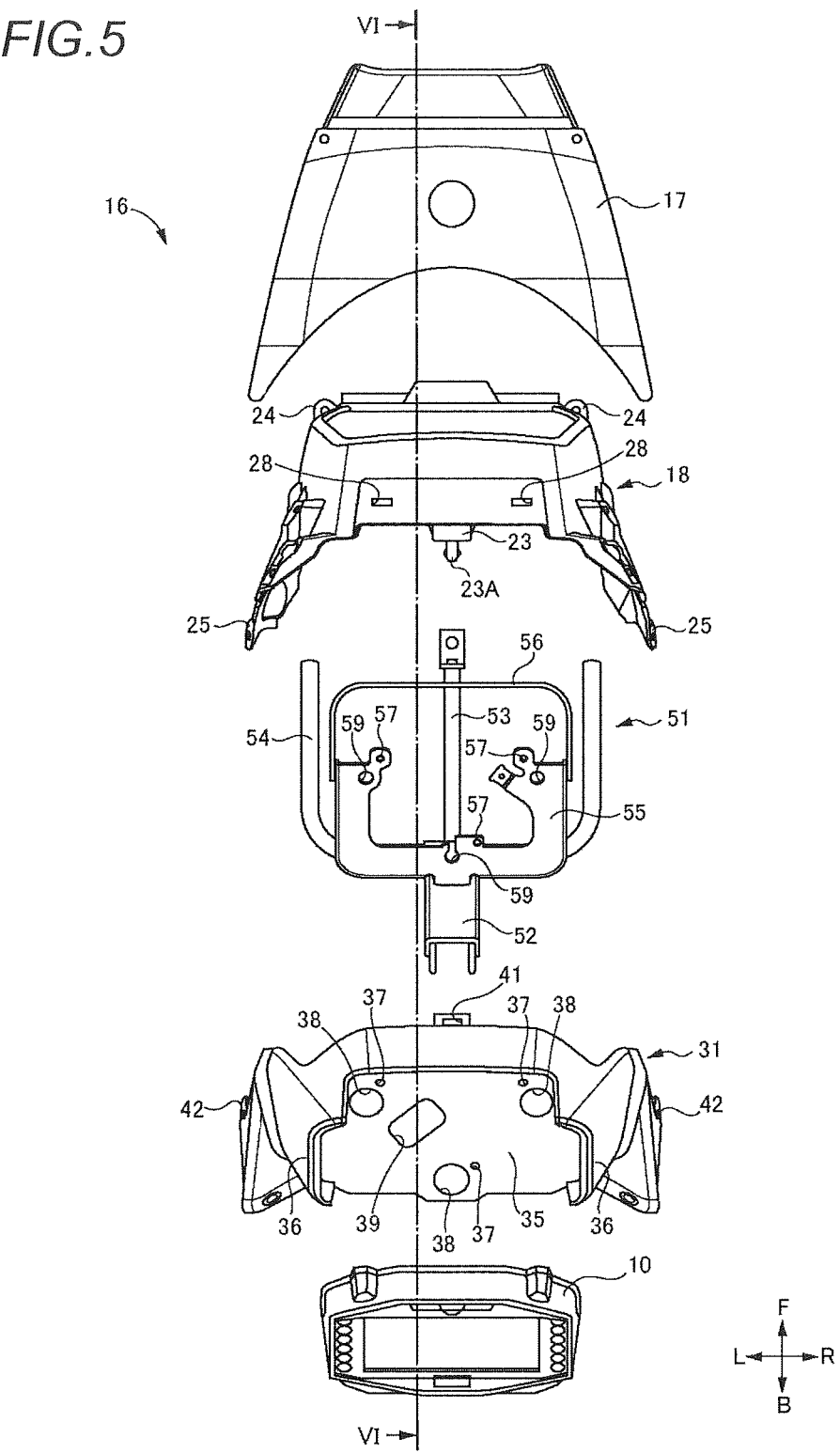
FIG. 5 is an illustrative view showing a state where a lower cover portion, a front cover portion and a rear cover portion of the center cover, a securing member and a meter unit are separated in the front structure of the straddle-type vehicle according to the embodiment of the present disclosure.
Figure 6:
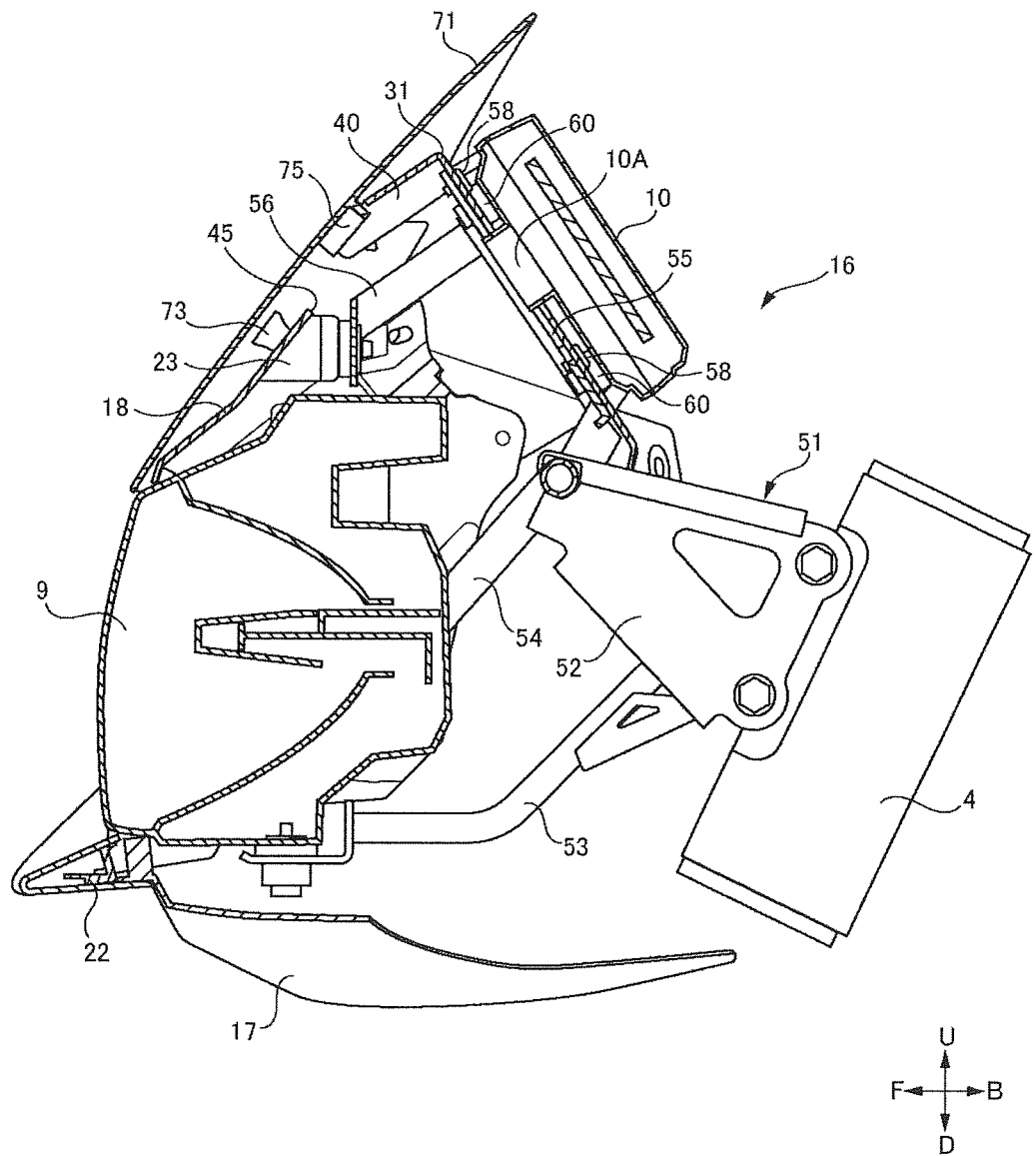
FIG. 6 is a cross-sectional view of the front structure of the saddle-type vehicle according to the embodiment of the present disclosure as viewed in a direction of arrows VI-VI in FIG. 4.
Figure 7:
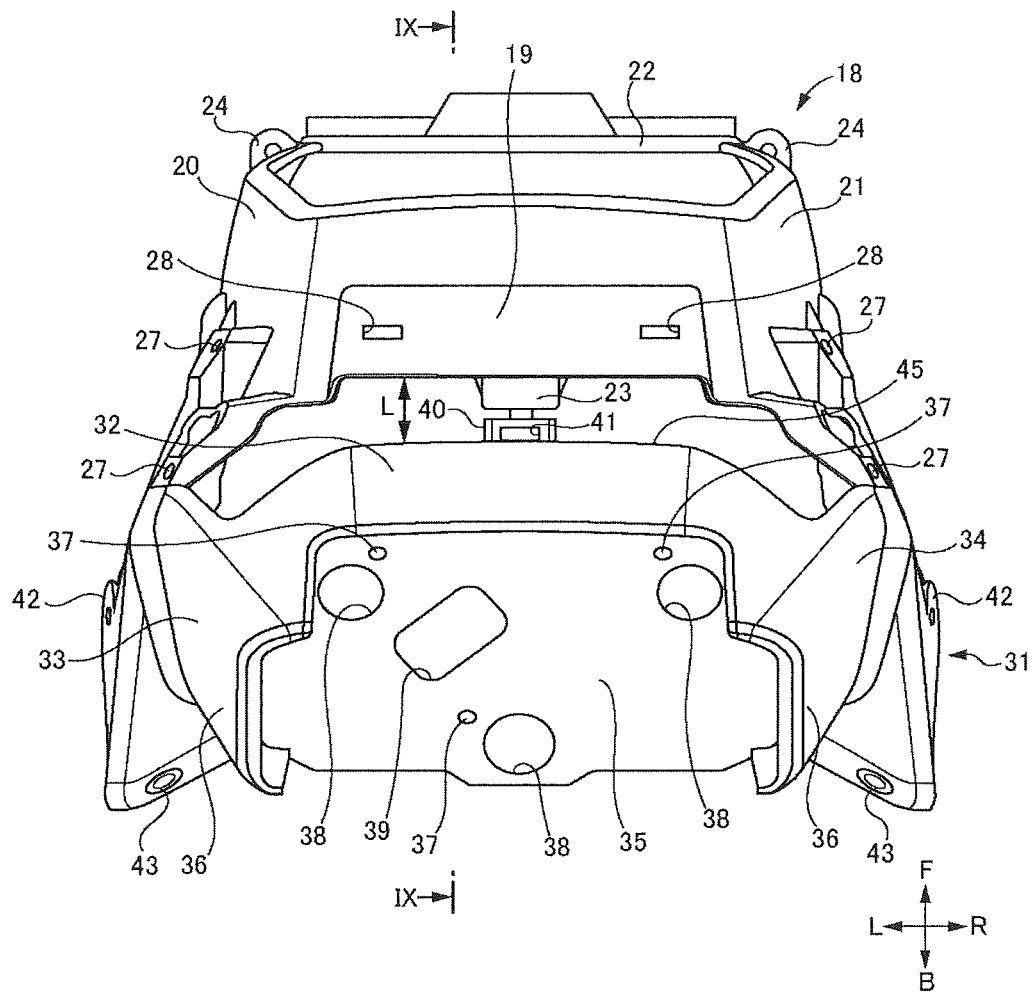
FIG. 7 is an illustrative view showing the front cover portion and the rear cover portion of the center cover in the front structure of the straddle-type vehicle according to the embodiment of the present disclosure as viewed from above.
Figure 8:
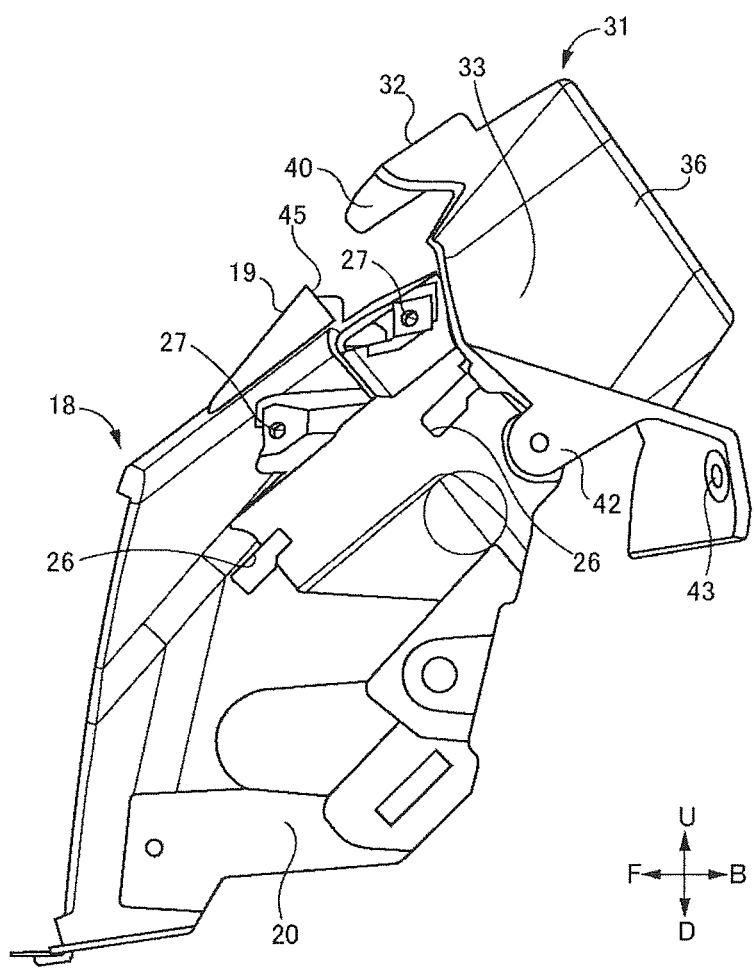
FIG. 8 is an illustrative view showing the front cover portion and the rear cover portion of the center cover in the front structure of the straddle-type vehicle according to the embodiment of the present disclosure as viewed from left.
Figure 9:
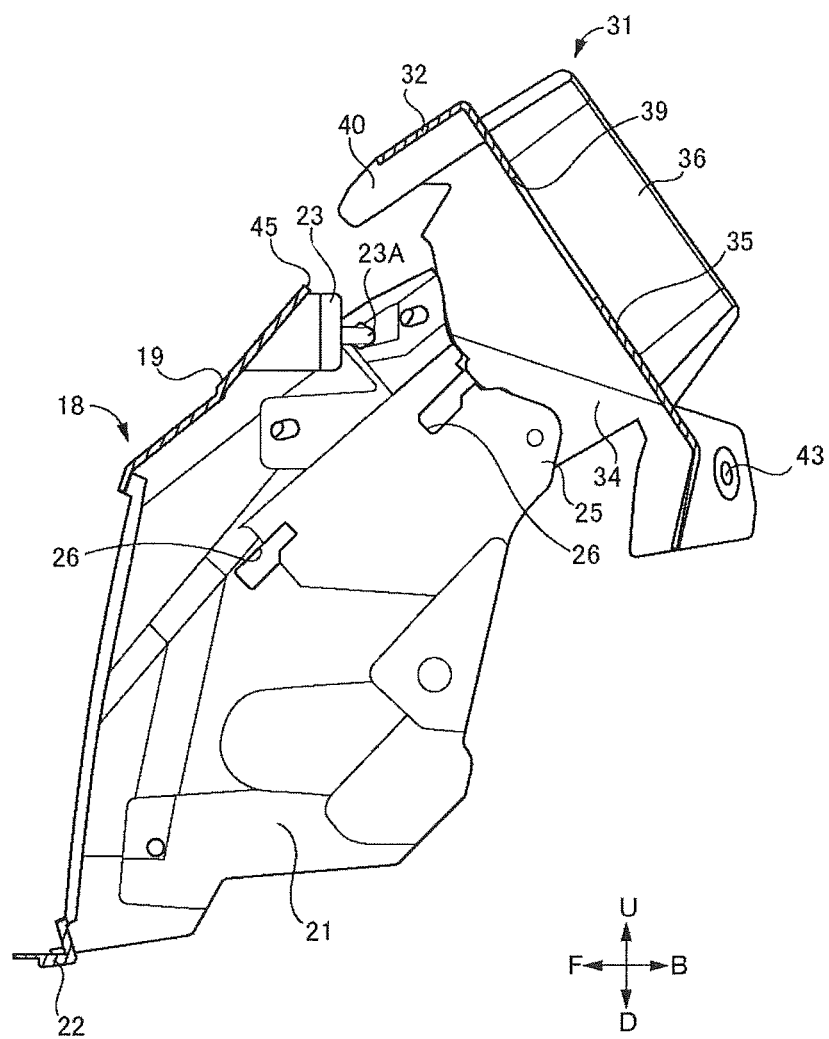
FIG. 9 is a cross-sectional view of the front cover portion and the rear cover portion of the center cover in the front structure of the saddle-type vehicle according to the embodiment of the present disclosure as viewed in a direction of arrows IX-IX in FIG. 7.
Figure 10:
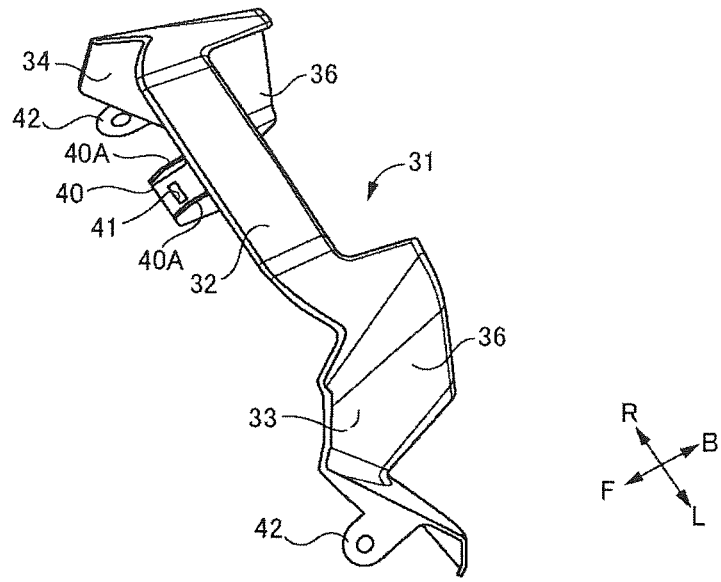
FIG. 10 is an external view of the rear cover portion of the center cover as viewed from upper left front.

FIG. 5 shows a state where a lower cover portion 17, a front cover portion 18 and a rear cover portion 31 of the center cover 16, the securing member 51 and the meter unit 10 are separated. FIG. 6 shows a cross section of the center cover 16, the headlight 9, the meter unit 10, the visor 71 or the like as viewed in the direction of arrows VI-VI in FIG. 4. Arrows VI-VI in FIG. 5 are the same as the arrows VI-VI in FIG. 4 and indicate positions of the cross sections of the center cover 16 and the meter unit 10 in FIG. 6. FIG. 7 shows only the front cover portion 18 and the rear cover portion 31 of the center cover 16 as viewed from above, and FIG. 8 shows only the front cover portion 18 and the rear cover portion 31 as viewed from left. FIG. 9 shows only the front cover portion 18 and the rear cover portion 31 of the center cover 16 as viewed in the direction of arrows IX-IX in FIG. 7. FIG. 10 shows the rear cover portion as viewed from upper left front.

As shown in FIG. 5, the center cover 16 includes the lower cover portion 17, the front cover portion 18 and the rear cover portion 31.

The lower cover portion 17 is located above the front wheel 8 and is formed substantially in a flat plate shape, for example, of resin or metal. The lower cover portion 17 forms a wall surface of a lower portion of the center cover 16 and mainly covers the lower side of the headlight 9.

The front cover portion 18 is formed of, for example, resin or metal, and includes an upper wall 19, a left wall 20 and a right wall 21 as shown in FIG. 7 to FIG. 8. The upper wall 19, the left wall 20 and the right wall 21 each have a curved or inclined portion in consideration of the windshield performance or design, but are formed substantially in a flat plate shape as a whole. The upper wall 19, the left wall 20 and the right wall 21 form upper, left and right wall surfaces at the front portion of the center cover 16, and cover the upper side, the left side and the right side of the headlight 9. A bridge portion 22 which is formed in an elongated plate shape extending in a left-right direction and which connects the left wall 20 and the right wall 21 is provided at a lower portion on a front end of the front cover portion 18.

In the front cover portion 18, as shown in FIG. 6, the upper wall 19 is provided with a connection portion 23 which is used for connection of the front cover portion 18 to a stay 56 which configures a part of the securing member 51 to be described later. The upper wall 19 of the front cover 18 is inclined upward and extends rearward, and the connection portion 23 projects rearward from a lower surface of the upper wall 19. As shown in FIG. 9, a locking projection portion 23A is provided in a projection end surface of the connection portion 23, and the connection portion 23 is connected to the stay 56 by locking the locking projection portion 23A in a locking hole (not shown) formed at a laterally central portion of the stay 56.

As shown in FIG. 7, connection portions 24 which are used for connection of the front cover portion 18 and the lower cover portion 17 are formed separately at a corner on a lower left front side and a corner on a lower right front side of the front cover portion 18. The connection portions 24 are connected to a corner on a left front side and a corner on a right front side of the lower cover portion 17 using screws or the like. As shown in FIG. 5, connection portions 25 which are used for connection of the front cover portion 18 and the rear cover portion 31 are provided separately at rear end portions of the left wall 20 and the right wall 21 in the front cover portion 18. The connection portions 25 are connected to connection portions 42 of the rear cover portion 31 using screws or the like. As shown in FIG. 8, a connection hole 26 which is used for connection of the center cover 16 and the left side cover 47 is formed in the left wall 20 of the front cover 18. As shown in FIG. 9, a connection hole 26 which is used for connection of the center cover 16 and the right side cover 48 is formed in the right wall 21 of the front cover 18. Fasteners which are used for connection of the center cover 16 to the left side cover 47 and the right side cover 48 are inserted in the connection holes 26 and locked therein.

As shown in FIG. 7, mounting holes 27 which are used for mounting of the visor 71 is formed in upper edges on a rear side of each of the left wall 20 and the right wall 21 of the front cover 18. Two mounting holes 27 are disposed apart from each other in the front-rear direction at the upper edge on the rear side of the left wall 20. Similarly, two mounting holes 27 are disposed at the upper edge on the rear side of the right wall 21. Two locking holes 28 which are used for locking and connecting of the visor 71 and the upper wall 19 are formed in a rear portion of the upper wall 19 of the front cover portion 18 and in a region near the center in the left-right direction. The locking holes 28 are apart from each other in the left-right direction, and are disposed at symmetrical positions with respect to the center in the left-right direction of the front cover portion 18.

The rear cover portion 31 is formed of, for example, resin or the like, as shown in FIG. 7 and FIG. 8, and includes an upper wall 32, a left wall 33, a right wall 34, and a rear wall 35 which are each formed substantially in a flat plate shape. Among the walls, the upper wall 32, the left wall 33 and the right wall 34 form upper, left and right wall surfaces at a rear portion of the center cover 16. The rear wall 35 functions as a plate which is used to secure the rear cover portion 31 to a meter brace 55 configuring a part of the securing member 51 to be described later.

The rear cover portion 31 is provided with a pair of left and right meter cover portions 36 which mainly cover the left side and the right side of the meter unit 10. Specifically, rear ends of the left wall 33 and the right wall 34 extend rearward and upward beyond the rear wall 35. The extending portions are the meter cover portions 36. As shown in FIG. 4, the meter unit 10 is disposed between the pair of meter cover portions 36.

As shown in FIG. 7, a plurality of mounting holes 37 which are used for mounting and securing of the rear cover portion 31 to the meter brace 55 are formed in the rear wall 35 of the rear cover portion 31. A plurality of through holes 38 for cushioning members 60 disposed between the meter unit 10 and the meter brace 55 to pass through are formed in the rear wall 35. An insertion hole 39 which is used for inserting of a cable connection portion 10A of the meter unit 10 is formed in the rear wall 35.

As shown in FIG. 10, at a front portion of a laterally central portion of the upper wall 32 of the rear cover portion 31, a projection portion 40 which projects downward and forward is provided. A locking hole 41 which is used for locking and connecting of the visor 71 and the upper wall 32 of the rear cover portion 31 is formed at a laterally central portion on a front end side of the projection portion 40.

Reinforcing ribs 40A which are used to reinforce the projection portion 40 are formed at left and right edges of the projection portion 40.

Connection portions 42 to be connected to the connection portions 25 of the front cover portion 18 are provided at a left lower portion and a right lower portion of the rear cover portion 31, respectively. Connection holes 43 which are used for connecting of the center cover 16 to the left side cover 47 and the right side cover 48 are provided in a left lower rear portion and a right lower rear portion of the rear cover portion 31, respectively. Fasteners which are used for connection of the center cover 16 to the left side cover 47 and the right side cover 48 are inserted in the connection holes 43 and locked therein.

A securing member 51 which secures the headlight 9, the meter unit 10 and the center cover 16 to the head pipe 4 of the vehicle body frame 3 is provided at the front upper portion of the straddle-type vehicle 1. As shown in FIG. 6, the securing member 51 includes a securing bracket 52, a center frame 53, a side frame 54, a meter brace 55, and a stay 56. All of these components of the securing member 51 are formed of metal such as iron.

The securing bracket 52 is disposed at a front side of the head pipe 4, and a rear portion of the securing bracket 52 is secured to the head pipe 4. The center frame 53 extends in the front-rear direction below the center cover 16, a rear end portion of the center frame 53 is secured to the securing bracket 52, and the headlight 9 is secured to a front end portion of the center frame 53. As shown in FIG. 5, the side frame 54 is formed in a U-shape or C-shape, a laterally central portion of the side frame 54 is secured to the securing bracket 52, and left and right ends of the side frame 54 respectively support the left wall 20 and the right wall 21 of the front cover 18.

As shown in FIG. 5, the meter brace 55 is a substantially flat metal plate having a U-shaped or C-shaped outer shape, and a laterally central portion of the meter brace 55 is secured to the securing bracket 52. Left and right portions of the meter brace 55 extend forward and upward from the securing bracket 52. As to be described below, the rear cover portion 31 and the meter unit 10 are attached to the meter brace 55.

As shown in FIG. 5, the stay 56 is formed in a U-shape or a C-shape, and left and right end portions of the stay 56 is secured to upper ends of left and right portions of the meter brace 55, respectively. As shown in FIG. 6, the connection portion 23 of the front cover portion 18 is connected to a laterally central portion of the stay 56.

As shown in FIG. 4, a communication port 45 is formed at a substantially central portion in the front-rear, and left-right directions of an upper surface of the center cover 16. That is, in a state where the front cover 16 is assembled by connecting the connection portion 23 of the front cover portion 18 to the stay 56, attaching the rear cover portion 31 to meter brace 55, and connecting the connection portions 24 of the front cover portion 18 and the connection portions 42 of the rear cover portion 31, or the like, a shape and arrangement of each of the front cover portion 18 and the rear cover portion 31 are set such that a rear edge of the upper wall 19 of the front cover portion 18 and a front edge of the upper wall 32 of the rear cover portion 31 are separated from each other. Thus, the communication port 45 is formed by separating the rear edge of the upper wall 19 of the front cover portion 18 and the front edge of the upper wall 32 of the rear cover portion 31 from each other.

FIG. 7 to FIG. 9 show only the front cover portion 18 and the rear cover portion 31 in order to make it easy to grasp a position, shape, size or the like of the communication port 45. As shown in FIG. 7 to FIG. 9, the communication port 45 is a hole which is opened upward and configured to communicate the inside and the outside of the center cover 16. The communication port 45 has such a size that a hand or a tool to can be inserted to the inside of the center cover 16 through the communication port 45 so as to allow attachment/detachment or taking out/in of a part.

The communication port 45 in the present embodiment is largely expanded in the left-right direction on the upper surface of the center cover 16. Specifically, a left end of the communication port 45 reaches a left end of the center cover 16, and a right end of the communication port 45 reaches a right end of the center cover 16. In FIG. 7, a length L of the communication port 45 in the front-rear direction is preferably about 30 mm to 50 mm. However, in a case where tools to be inserted into the communication port 45 is limited to tools such as drivers, pincers, pliers, and long and narrow jigs, etc., the length L of the communication port 45 in the front-rear direction may be set to about 10 mm to 20 mm. Meanwhile, the length L of the communication port 45 in the front-rear direction may be set to 50 mm to 80 mm or more, so that a fingertip to a wrist can be inserted into the communication port 45.

As shown in FIG. 6, inside the center cover 16, a rear portion of the headlight 9 and a rear portion of the meter unit 10 are facing each other, and a cable connected to a cable connection portion of the headlight 9 and a cable connected to the cable connection 10A of the meter unit 10 are disposed. An operator can touch the rear portion of the headlight 9, the rear portion of the meter unit 10, and cables disposed inside the center cover 16 with a hand or a tool by inserting the hand or the tool from the communication port 45.

As shown in FIG. 6, the visor 71 is attached to an upper portion of the center cover 16. When the visor 71 is attached to the center cover 16, an upper side of the communication port 45 is covered by the visor 71. Thus, the communication port 45 is substantially closed by the visor 71. Since the visor 71 is formed of an opaque material, as shown in FIG. 3, the communication port 45 is hidden by the visor 71 and cannot be seen from the outside in a state where the visor 71 is attached to the center cover 16. The visor 71 is attachable and detachable as to be described later. By removing the visor 71 from the center cover 16, it is possible to insert a hand or a tool into the communication port 45.

According to the present embodiment described above, the communication port 45 which is opened upward and configured to communicate the inside and outside of the front cover portion 16 is provided between the front cover portion 18 and the rear cover portion 31, which make it possible to insert a hand or a tool to the inside of the front cover 16 to allow attachment/detachment or taking out/in of a part, the operator can remove the visor 71, insert a hand or a tool from the communication port 45, and easily perform maintenance or repair of the straddle-type vehicle 1. For example, the operator can insert a hand or a tool from the communication port 45, and attach and detach a cable connector with respect to the cable connection portion of the headlight 9 or the cable connection portion 10A of the meter unit 10 facing the inside of the center cover 16. The operator can insert a hand or a tool from the communication port 45, take out the cable connector and cable detached from the cable connection portion of the headlight 9 or the cable connection portion 10A of the meter unit 10 to the outside of the center cover 16 through the communication port 45, and replace the cable connector or cable. In addition, for example, when attaching an electrical component such as an antenna for ETC (Electronic Toll Collection System) to a periphery of the meter unit, etc., the operator can put the cable to be connected to the electrical component into the center cover 16 through the communication port 45, and then wire around the head pipe 4 toward components (for example, a main body, a battery, etc. of an ETC communication device) disposed at a center portion or a rear portion of the straddle-type vehicle 1 in the front-rear direction. An operator can insert a tool from the communication port 45 to attach or detach a screw to/from a component disposed inside the center cover 16. By setting the length in the front-rear direction of the communication port 45 to, for example, about 50 mm to 80 mm or more, a bulb can be taken in and out through the communication port 45 when replacing the bulb of the headlight 9.

According to the present embodiment, since a hand or a tool can be inserted from the communication port 45 to the inside of the center cover 16, it is possible to save the efforts of removing the center cover 16 from the straddle-type vehicle 1 when performing maintenance or repair. Since the communication port 45 is provided in the center cover 16 in a manner of being opened upward, the operator can insert a hand or a tool from above the center cover 16 and can work in an easy posture. Therefore, operability of such as maintenance or repair of the headlight 9, the meter unit 10 or parts provided in a periphery thereof can be improved. The communication port 45 can be used for assembling of parts into the center cover 16 even when the straddle-type vehicle 1 is manufactured. Therefore, according to the present embodiment, operability during manufacturing of the saddle-type vehicle 1 can also be enhanced.

(Visor)

Figure 11:
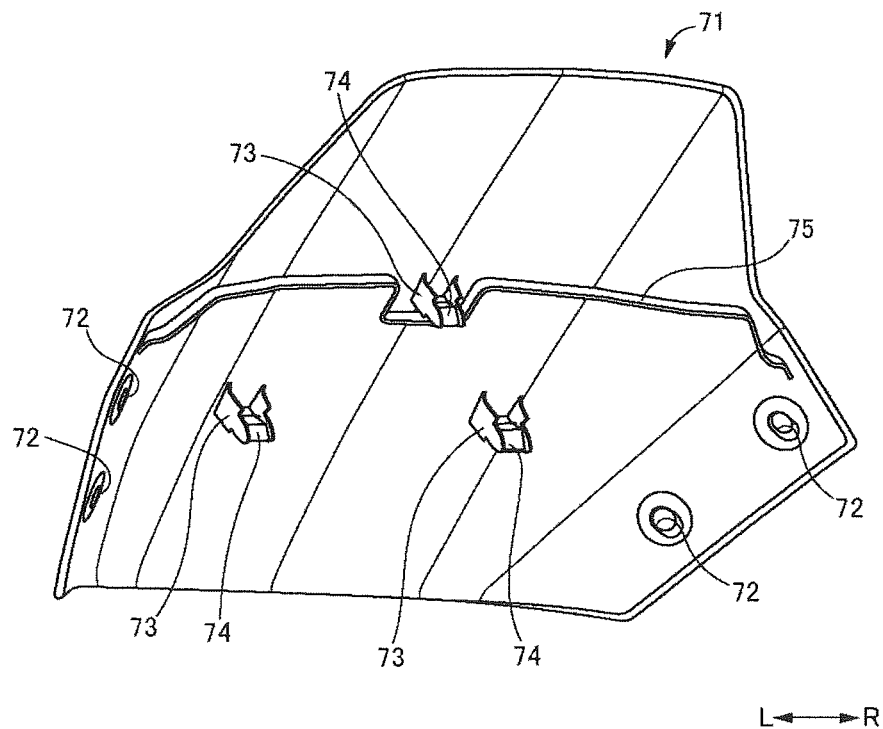
FIG. 11 is an external view of the visor in the front structure of the straddle-type vehicle according to the embodiment of the present disclosure as viewed from rear left.

FIG. 11 shows the visor 71 as viewed from rear left. As described above, the visor 71 is attached to the upper portion of the center cover 16. As shown in FIG. 11, the visor 71 is formed of, for example, an opaque resin material in a plate shape extending forward, rearward, leftward, and rightward. In addition, the visor 71 has a cross-sectional shape which is curved such that a laterally central portion thereof is raised or left and right edges thereof respectively go down. As shown in FIG. 1, the visor 71 is disposed to be inclined upward from the front to the rear.

As shown in FIG. 3, when the saddle-type vehicle 1 is viewed from above, a front edge of the visor 71 reaches above the headlight 9 and a rear edge of the visor 71 reaches above the meter unit 10. The left edge and the right edge of the visor 71 reach the left edge and the right edge of the center cover 16 respectively. Thus, the visor 71 entirely covers the center cover 16 from above. The communication port 45 formed on the upper surface of the center cover 16 is completely covered by the visor 71.

A plurality of mounting holes 72 which are used for attachment of the visor 71 to the center cover 16 are formed at the left and right edges of the visor 71. The number and positions of the mounting holes 72 correspond to the number and positions of the mounting holes 27 formed in the front cover portion 18. For example, screws are machined in the mounting holes 27 of the front cover portion 18. Male screws are inserted into the mounting holes 72 of the visor 71 and are fastened to the mounting holes 27 of the front cover portion 18, and thus the visor 71 is secured to the front cover portion 18.

The visor 71 is provided with a plurality of locking projection pieces 73 as locking portions which lock the visor 71 to a part of the front cover portion 18 which forms a peripheral edge of the communication port 45 and a part of the rear cover portion 31 which forms a peripheral edge of the communication port 45. In the present embodiment, three locking projection pieces 73 are provided in the visor 71. Two of the three locking projection pieces 73 are respectively disposed at left and right sides of a front portion of the visor 71. Parts of the two locking projection pieces 73 correspond to positions of the two locking holes 28 formed in the upper wall 19 of the front cover portion 18. The remaining one of the three locking projection pieces 73 is disposed in a laterally central portion of a rear portion of the visor 71. A position of the locking projection piece 73 corresponds to a position of the locking hole 41 formed in the projection portion 40 of the rear cover portion 31. Each locking projection pieces 73 is integrally formed with the visor 71, for example, by resin molding. Each locking projection piece 73 projects downward from a lower surface (back surface) of the visor 71 (since the visor 71 is inclined as described above, in consideration of this, each locking projection piece 73 projects rearward and downward from the back surface of the visor 71). A clip member 74 is attached to each locking projection piece 73.

Figure 12:
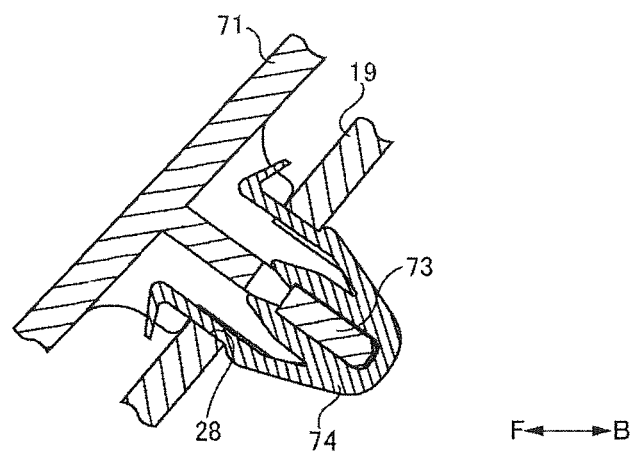
FIG. 12 is an illustrative diagram showing a state where a locking projection piece of the visor is connected to a locking hole of the front cover portion by a clip portion in the front structure of the straddle-type vehicle according to the embodiment of the present disclosure.

In a state where the left and right edges of the visor 71 are screwed into the mounting holes 27 and attached to the left edge and the right edge of the front cover portion 18 as described above, tip sides of the locking projection pieces 73 and tip sides of the clip members 74 enter the locking holes 28 and the locking hole 41 respectively, and the locking projection pieces 73 are locked in the locking holes 28 and the locking hole 41 via the clip members 74. Accordingly, the part of the front cover portion 18 which forms a peripheral edge of the communication port 45 and the part of the rear cover portion 31 which forms a peripheral edge of the communication port 45 are connected to the visor 71. Here, FIG. 12 shows a state where the locking projection piece 73 and the locking hole 28 are connected by the clip member 74.

The visor 71 can be removed from the front cover portion 18 by removing all the screws fastening the left and right edges of the visor 71 in the mounting hole 27, and removing the locking projection pieces 73 from the locking holes 28 and the locking hole 41, respectively.

According to the present embodiment as described above, the part of the front cover portion 18 which forms a peripheral edge of the communication port 45 and the part of the rear cover portion 31 which forms a peripheral edge of the communication port 45 are connected via the visor 71, so that rigidity of the center cover 16 can be enhanced. For example, it is possible to suppress the front cover portion 18 or the rear cover portion 31 from vibrating and generating noise due to vibration during traveling.

Due to a configuration in which a central portion of the visor 71 is connected to the front cover portion 18 and the rear cover portion 31 by the locking projection pieces 73 integrally formed on the back surface of the visor 71 and the clip members 74 attached to the locking projection pieces 73, each locking projection piece 73 and clip member 74 can be hidden as viewed from the outside in a state where the visor 71 is attached to the front cover portion 18 and the rear cover portion 31, and good appearance can be obtained.

By using the clip members 74 to connect the central portion of the visor 71 to the front cover portion 18 and the rear cover portion 31, connection and removal of the central portion of the visor 71 with the front cover portion 18 and the rear cover portion 31 can be performed with one touch, respectively.

Meanwhile, a light shielding wall 75 is provided on the lower surface (rear surface) of the visor 71 to shield light in a predetermined direction which is emitted from the headlight 9 and leaks to an outside of the center cover 16 through the inside of the center cover 16 and the communication port 45. In the present embodiment, the light shielding wall 75 is configured by a rib formed on the lower surface of the visor 71. The light shielding wall 75 (the rib) is integrally formed on the lower surface of the visor 71, for example, by resin molding. The light shielding wall 75 projects from the lower surface of the visor 71 so as to close a gap between the visor 71 and the upper wall 32 of the rear cover portion 31. The light shielding wall 75 extends in the left-right direction from the left edge to the right edge of the visor 71, and a length thereof is equal to or longer than the length of the communication port 45 in the left-right direction. A laterally central portion of the light shielding wall 75 is bent so as to bypass the front of the locking projection piece 73.

Figure 13:
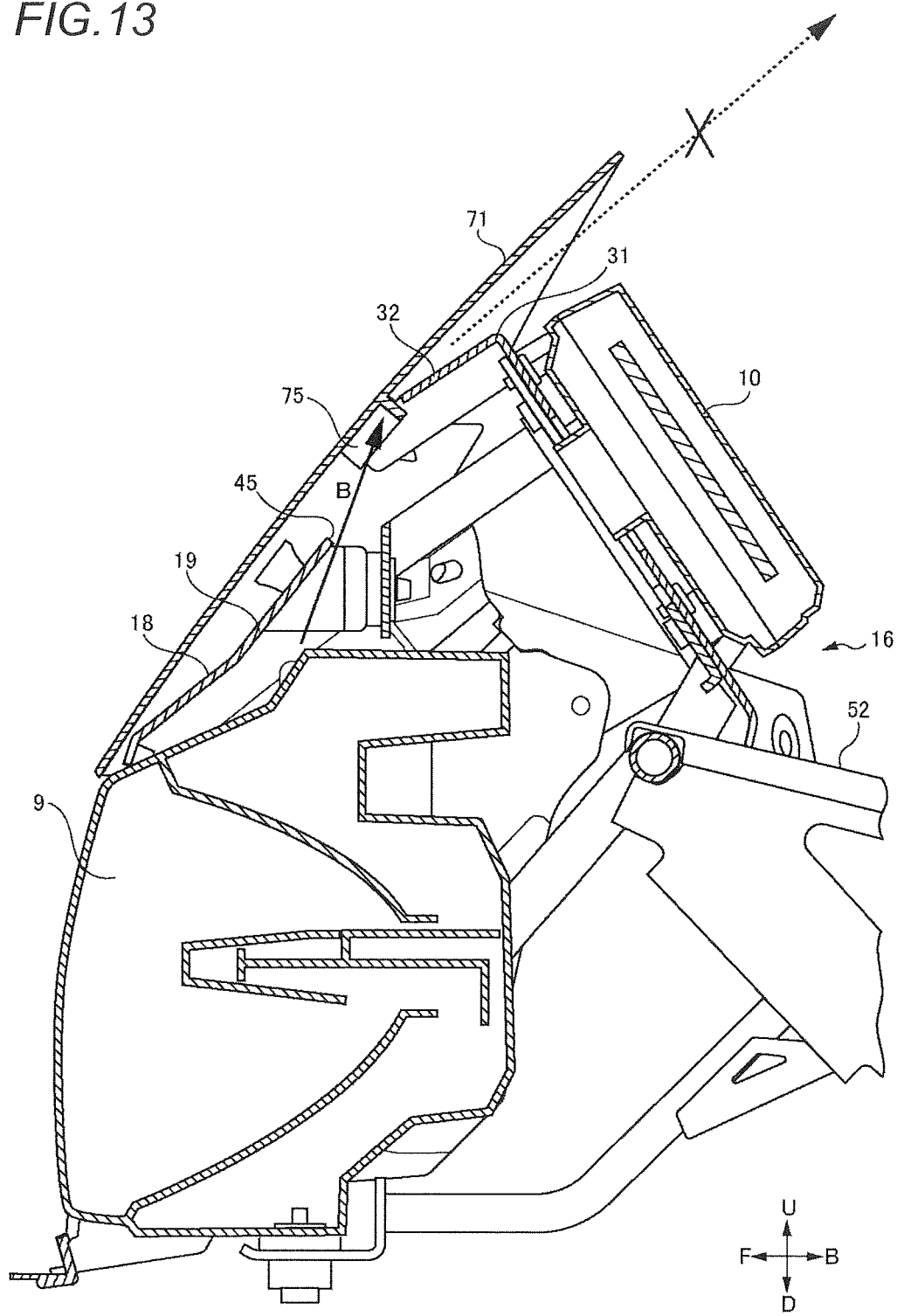
FIG. 13 is an illustrative diagram showing a state where light emitted from the headlight is shielded by a light shielding wall of the visor in the front structure of the straddle-type vehicle according to the embodiment of the present disclosure.

Here, FIG. 13 shows a state where the light emitted from the headlight 9 is shielded by the light shielding wall 75 of the visor 71. Since the communication port 45 is formed between the front cover portion 18 and the rear cover portion 31, the light leaked from the rear of the headlight 9 leaks to the outside of the center cover 16 through the inside of the center cover 16 and the communication port 45. Assuming that there is no light shielding wall 75, the light is considered to travel rearward and upward through the gap between the visor 71 and the upper wall 32 of the rear cover portion 31 and enters eyes of a driver seated on a seat of the saddle-type vehicle 1 as indicated by a dotted arrow in FIG. 13. In the present embodiment, since the light shielding wall 75 is disposed to close the gap between the visor 71 and the upper wall 32 of the rear cover portion 31, the light which leaks from the communication port 45 and travels in a predetermined direction (upward and rearward) can be shielded by the light shielding wall 75, and the light can be prevented from entering eyes of a driver.

(Attachment of Rear Cover Portion and Meter Unit)

Figure 14:
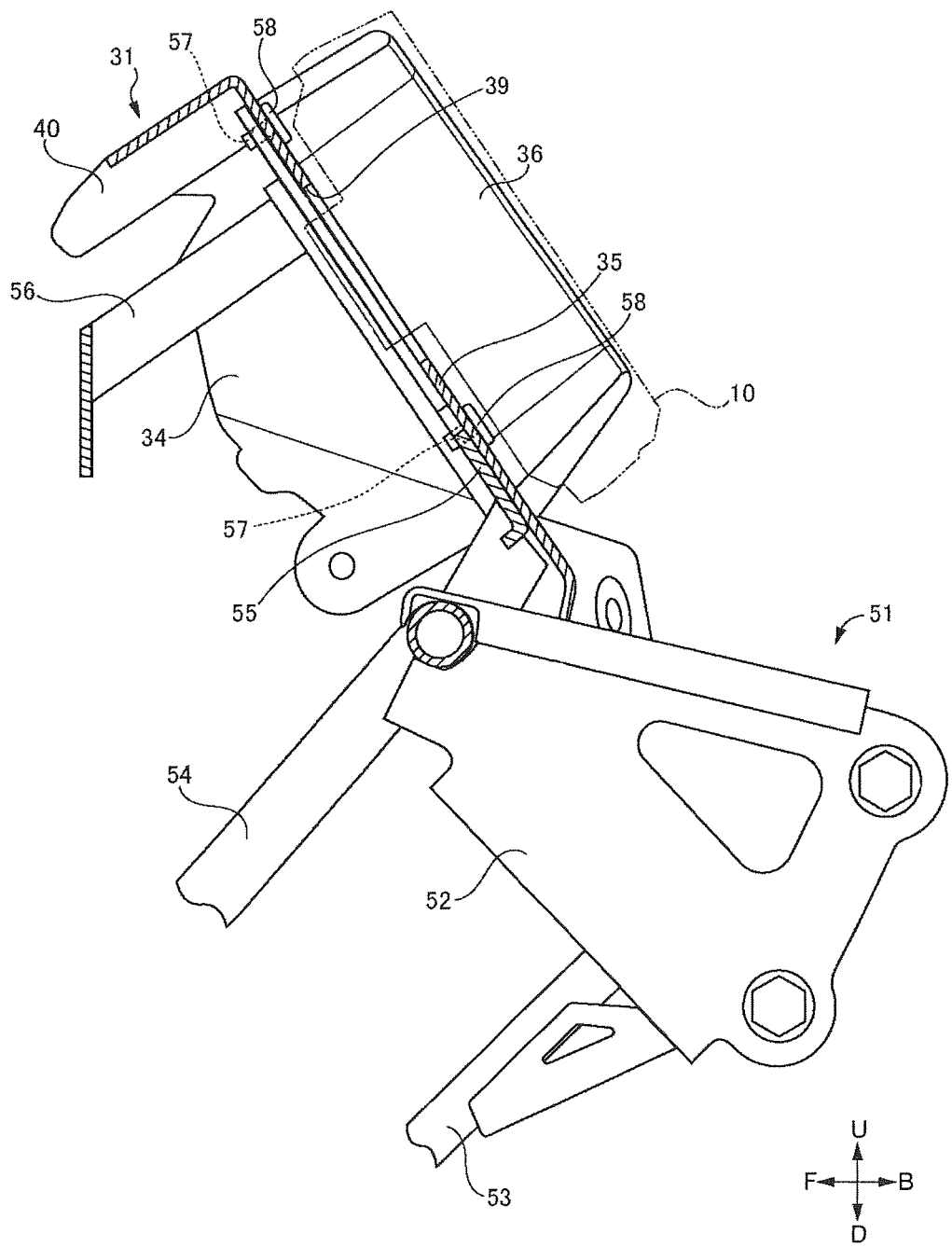
FIG. 14 is a cross-sectional view showing an attachment structure of the rear cover portion to a meter brace in the front structure of the saddle-type vehicle shown in FIG. 6.
Figure 15:
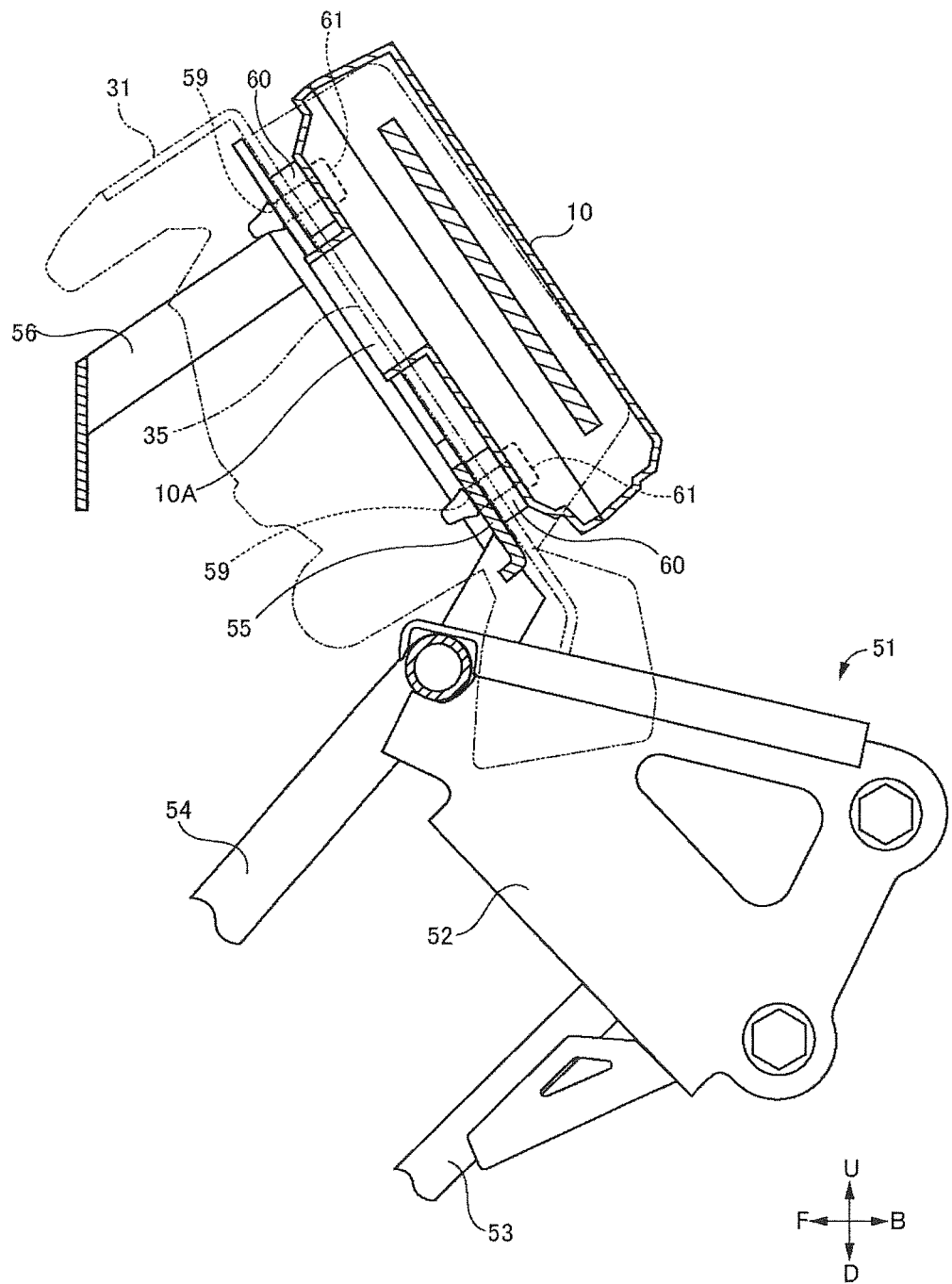
FIG. 15 is a cross-sectional view showing an attachment structure of the meter unit to the meter brace in the front structure of the saddle-type vehicle shown in FIG. 6.

FIG. 14 shows an attachment structure of the rear cover portion 31 to the meter brace 55 which is extracted from the front structure of the saddle-type vehicle 1 shown in FIG. 6. FIG. 15 shows an attachment structure of the meter unit 10 to the meter brace 55 which is extracted from the front structure of the saddle-type vehicle 1 shown in FIG. 6.

As shown in FIG. 14 and FIG. 15, the rear cover portion 31 and the meter unit 10 are attached to the meter brace 55 without contacting each other.

That is, as shown in FIG. 5, a plurality of (for example, three) mounting holes 57 are formed in the meter brace 55. A plurality of mounting holes 37 are formed in the rear wall 35 of the rear cover portion 31 at positions corresponding to the mounting holes 57. screws are machined in the mounting holes 57 of the meter brace 55. As shown in FIG. 14, male screws 58 are inserted into the mounting holes 37 of the rear wall 35 and fastened in the mounting holes 57 of the meter brace 55, and thus the rear cover portion 31 is secured to the meter brace 55.

Meanwhile, as shown in FIG. 5, a plurality of (for example, three) mounting holes 59 are formed in the meter brace 55. A plurality of through holes 38 are formed in the rear wall 35 of the rear cover portion 31 at positions corresponding to the mounting holes 59. As shown in FIG. 15, the meter unit 10 is secured to the meter brace 55 by locking fasteners 61 in the mounting holes 59 of the meter brace 55 via the plurality of cushioning members 60. Each cushioning member 60 is a cylindrical cushion member formed of, for example, rubber, urethane or the like, and is inserted into the through hole 38 formed in the rear wall 35 of the rear cover portion 31. A rear end surface of each cushioning member 60 is in contact with the meter brace 55, and a front end surface of each cushioning member 60 is in contact with the meter unit 10. Since an axial length of each cushioning member 60 is larger than a thickness of the rear wall 35 of the rear cover portion 31, each cushioning member 60 passes through the through hole 38, and a rear end side thereof projects rearward from a rear facing surface of the rear wall 35. In other words, the meter unit 10 is separated from the rear wall 35 of the rear cover portion 31 in a state of being in contact with the rear end surface of each cushioning member 60.

As shown in FIG. 15, the cable connection portion 10A of the meter unit 10 is inserted into the insertion hole 39 (with reference to FIG. 5) formed in the rear wall 35 of the rear cover portion 31. Accordingly, the cable connection portion 10A of the meter unit 10 faces the inside of the center cover 16. The cable connection portion 10A is inserted into the insertion hole 39 in a state of being separated from a peripheral edge portion of the insertion hole 39, and is not in contact with the rear wall 35 of the rear cover portion 31. Although the meter cover portion 36 of the rear cover portion 31 is also disposed in a vicinity of the meter unit 10, the meter cover portion 36 is not in contact with the meter unit 10. That is, the meter unit 10 is not in contact with the rear cover portion 31 at any portion thereof.

As described above, according to the present embodiment, since the rear cover portion 31 and the meter unit 10 are attached to the meter brace 55 without contacting each other, vibration from the rear cover portion 31 can be prevented from being transmitted to the meter unit 10. Accordingly, decrease in visibility of display of the meter unit 10 due to vibration of meter unit 10 can be suppressed. As described above, in the saddle-type vehicle 1 of the present embodiment, the visor 71 and the rear cover portion 31 are connected via the locking projection pieces 73 or the like. Therefore, if the rear cover portion 31 is directly attached to the meter unit 10 and the meter unit 10 is in contact with the rear cover portion 31, when the visor 71 vibrates due to a traveling wind, the vibration is transmitted to the meter unit 10 through the rear cover portion 31, and the meter unit 10 may vibrate. According to the present embodiment, the contact between the meter unit 10 and the rear cover portion 31 are broken, the vibration of the meter unit 10 can be prevented.

Although a case where the communication port 45 is formed to be wide in the left-right direction from a left end to a right end of the center cover 16 has been exemplified in the above embodiment, a size of the communication port 45 in the left-right direction is not limited thereto.

Although a case where the visor 71 is opaque has been exemplified in the above embodiment, the visor 71 may be translucent or transparent. The visor in the embodiment includes a part called a screen or shield.

In the above embodiment, the visor 71 and the laterally central portion of the upper wall 19 of the front cover 18 are connected at two places by the locking projection pieces 73 etc., and the visor 71 and the laterally central portion of the rear cover portion 31 are connected at one place by the locking projection 73 etc., but the connection places are not limited thereto. The visor 71 and the laterally central portion of the upper wall 19 of the front cover portion 18 or the visor 71 and the laterally central portion of the rear cover portion 31 may be connected by using other connection members such as screws.

Although a case where the light shielding wall 75 is formed by providing a rib on the back surface of the visor 71 has been exemplified in the above embodiment, the light shielding wall may be formed, for example, by partially bending the visor 71.

The present disclosure can be applied not only to a motorcycle provided with a half cowl as shown in FIG. 1 but also to a motorcycle provided with a full cowl. Further, the present disclosure can be applied not only to sports type motorcycles as shown in FIG. 1 but also to off-road type motorcycles and various types of motorcycles such as scooters. Further more, the present disclosure can also be applied to straddle-type vehicles such as tricycles and buggies.

Further, the present disclosure can be appropriately changed within a scope not contrary to the gist or idea of the present disclosure which can be read from the entire claims and the specification, and a front structure of a saddle-type vehicle with such a change is also included in the technical concept of the present disclosure.

What is claimed is:

1. A front structure of a saddle-type vehicle, comprising:
    a headlight provided in a front upper portion of the saddle-type vehicle;
    a meter provided behind the headlight in the saddle-type vehicle;
    a vehicle body cover that covers the front upper portion of the saddle-type vehicle; and
    a visor disposed at an upper side of the vehicle body cover,
    wherein the vehicle body cover includes:
        a front cover portion which forms a wall surface of a laterally central front portion of the vehicle body cover and covers all or a part of an upper side, a lower side, a left side and a right side of the headlight; and
        a rear cover portion which forms a wall surface of a laterally central rear portion of the vehicle body cover and covers all or a part of an upper side, a lower side, a left side and a right side of the meter,
    wherein a communication port opened upward and configured to communicate an inside and an outside of the vehicle body cover is provided between the front cover portion and the rear cover portion,
    wherein the visor is detachably attached to the vehicle body cover so as to cover the communication port from above, and
    wherein a part of the front cover portion which forms a peripheral edge of the communication port and a part of the rear cover portion which forms a peripheral edge of the communication port are detachably connected to the visor, respectively.

2. The front structure of the saddle-type vehicle according to claim 1, wherein the communication port has such a size that a hand or a tool can be inserted to the inside of the vehicle body cover through the communication port to allow attachment/detachment or taking out/in of a part.

3. The front structure of the saddle-type vehicle according to claim 1, wherein the visor is provided with a plurality of locking portions by which the visor is locked to the part of the front cover portion which forms the peripheral edge of the communication port and the part of the rear cover portion which forms the peripheral edge of the communication port, and each of the plurality of locking portion is integrally formed with the visor and provided with a projection piece projecting from a lower surface of the visor.

4. A front structure of a saddle-type vehicle, comprising:
    a headlight provided in a front upper portion of the saddle-type vehicle;
    a meter provided behind the headlight in the saddle-type vehicle;
    a vehicle body cover that covers the front upper portion of the saddle-type vehicle; and
    a visor disposed at an upper side of the vehicle body cover,
    wherein the vehicle body cover includes:
        a front cover portion which forms a wall surface of a laterally central front portion of the vehicle body cover and covers all or a part of an upper side, a lower side, a left side and a right side of the headlight; and
        a rear cover portion which forms a wall surface of a laterally central rear portion of the vehicle body cover and covers all or a part of an upper side, a lower side, a left side and a right side of the meter,
    wherein a communication port opened upward and configured to communicate an inside and an outside of the vehicle body cover is provided between the front cover portion and the rear cover portion,
    wherein the visor is detachably attached to the vehicle body cover so as to cover the communication port from above, and
    wherein a lower surface of the visor is provided with a light shielding wall to shield light which is emitted from the headlight and leaks to the outside of the vehicle body cover through the inside of the vehicle body cover and the communication port.

5. The front structure of the saddle-type vehicle according to claim 4, wherein the light shielding wall projects from the lower surface of the visor so as to close a gap between the visor and an upper wall of the rear cover portion.

6. A front structure of a saddle-type vehicle, comprising:
    a headlight provided in a front upper portion of the saddle-type vehicle;
    a meter provided behind the headlight in the saddle-type vehicle;
    a vehicle body cover that covers the front upper portion of the saddle-type vehicle;
    a visor disposed at an upper side of the vehicle body cover; and
    a securing member configured to secure the meter and the vehicle body cover to a vehicle body frame of the saddle-type vehicle,
    wherein the vehicle body cover includes:
        a front cover portion which forms a wall surface of a laterally central front portion of the vehicle body cover and covers all or a part of an upper side, a lower side, a left side and a right side of the headlight; and
        a rear cover portion which forms a wall surface of a laterally central rear portion of the vehicle body cover and covers all or a part of an upper side, a lower side, a left side and a right side of the meter,
    wherein a communication port opened upward and configured to communicate an inside and an outside of the vehicle body cover is provided between the front cover portion and the rear cover portion,
    wherein the visor is detachably attached to the vehicle body cover so as to cover the communication port from above,
    wherein the securing member includes a brace configured to support the rear cover portion and the meter, and
    wherein the rear cover portion and the meter are attached to the brace without contacting each other.

* * * * *